US006261041B1

(12) United States Patent
Nakamura

(10) Patent No.: US 6,261,041 B1
(45) Date of Patent: Jul. 17, 2001

(54) CLAMPING SCREW

(76) Inventor: Daijiro Nakamura, 662-2, Shimokishi-cho, Ono-shi, Hyougo Prefecture, 675-13 (JP)

( * ) Notice: Subject to any disclaimer, the term of this patent is extended or adjusted under 35 U.S.C. 154(b) by 0 days.

(21) Appl. No.: 09/091,976

(22) Filed: Nov. 27, 1998

(30) Foreign Application Priority Data

Jan. 8, 1996 (JP) .................................................. 8-018406
Apr. 2, 1996 (JP) .................................................. 8-106265

(51) Int. Cl.[7] ............................ F16B 23/00; F16B 37/08
(52) U.S. Cl. ............................ 411/432; 411/428; 411/917
(58) Field of Search .................................... 411/428, 432, 411/433, 348, 917

(56) References Cited

U.S. PATENT DOCUMENTS

| | | | | |
|---|---|---|---|---|
| 4,955,744 | * | 9/1990 | Barth et al. | 411/432 X |
| 5,388,942 | * | 2/1995 | Bonacina et al. | 411/432 |
| 5,567,100 | * | 10/1996 | Nakamura | 411/433 |
| 5,810,533 | * | 9/1998 | Nakamura | 411/432 |
| 5,871,322 | * | 2/1999 | Nakamura | 411/432 |
| 5,899,648 | * | 5/1999 | Kanaan et al. | 411/432 |
| 6,050,741 | * | 4/2000 | Aultman et al. | 411/432 X |

* cited by examiner

*Primary Examiner*—Neill Wilson
(74) *Attorney, Agent, or Firm*—Nelson Mullins Riley & Scarborough

(57) ABSTRACT

A clamping screw for holding a tool to a threaded shaft is provided with a body member having a threaded surface for engagement with the threaded shaft. A flange ring is disposed about the body member and clampingly engages the tool when the body is threaded onto the shaft in engagement with the tool. An operating ring is rotatably disposed about the body member and retained from movement axially away from the flange ring. A torque increasing mechanism is operatively disposed about the body member between the operating ring and the flange ring and is configured to transmit torque from the operating ring to the body member. The torque increasing mechanism includes a first inclined cam surface disposed on the operating ring, a cam ring axially movably disposed but rotationally fixed about the body member, a second inclined cam surface disposed on the cam ring opposite to and corresponding to the first inclined surface, and a bearing supported on a retainer and disposed between the first inclined cam surface and the second inclined cam surface. The operating ring is rotatable with respect to the cam ring so that rotation of the operating ring applies torque and axial force to the cam ring through the bearing. A spring is operatively disposed between the cam ring and the operating ring and biases the cam ring toward an initial position with respect to the operating ring.

15 Claims, 10 Drawing Sheets

CLAMPING SCREW

DETAILED DESCRIPTION

1. Technical Field of the Invention

This invention is a clamping screw such as an attachment nut or an attachment bolt and used to fix to the drive shaft of an electric tool a rotating tool such as the grindstone of a hand grinder or a circular hand saw, and relates to a clamping screw which is able to clamp by increasing the torque of a manually input rotational force.

2. Prior Art

The above-mentioned attachment nuts or bolts in prior art are clamping screws comprised of a threaded member forming a thread for attachment to the drive shaft of said electric tool, an operating ring to which the rotational force for clamping is input manually, and a differential retardation mechanism provided between these which increases torque by retarding the rotational force of the operating ring (for example, Japanese Patent No.4-257419).

Since the above-described differential retardation mechanism increases the torque by retardation, despite the advantage that the rotating tool can be clamped and fixed strongly with a small rotation of the operating ring, the mechanism is complex and has the disadvantage that precision is required in manufacture.

Problems To Be Resolved By The Invention

This invention has as its purpose the provision of a clamping screw which, unlike a structure such as the above-mentioned differential retardation mechanism, is not complex and does not require precision manufacture, has a power structure (a torque-increasing mechanism) of simple construction, and is able to clamp powerfully with a small rotational input.

This invention is characterized in being a clamping screw provided with a threaded member forming an attachment thread which screws together with the thread for attachment of the member to be attached to the shaft part, an operating ring supported on the outer surface of the outer end of said threaded member so as to freely rotate only and to which rotational force is input, a flange ring inserted over the outer surface of the inner end of said threaded member and having a flange surface which abuts the object to be attached on the clamping side from the inner end of said threaded member, and a torque-increasing mechanism on the outer surface of said threaded member between said operating ring and said flange ring and which increases the torque of the rotational force of the operating ring transmitting this to the flange ring, said torque-increasing mechanism being comprised with an inclined cam surface which applies an effective force in the direction of clamping to elements in contact through the rotation in the direction of clamping of said operating ring formed in the circumferential direction of the inner surface of said operating ring, a cam ring which is freely slidable in the axial direction only inserted over the outer surface of said threaded member, a coupled inclined cam surface which corresponds to the sloping cam surface of said operating ring formed on said cam ring, a needle bearing supported on a retainer fitted between the inclined cam surface of said operating ring and the coupled inclined cam surface of said cam ring, and a spring fitted between said cam ring and said operating ring which returns said cam ring to its initial position when the cam ring is not in operation, and moreover is characterized in being a clamping screw fitted with an adjustment ring between said cam ring and flange ring which applies to an adjustment to the rotation relative to the operating ring.

According to the invention, up until the point where the flange surface of the flange ring abuts the object to be attached with the attachment thread of the threaded member screwed onto the thread for attachment of member to be attached, since the screw resistance of the attachment thread of the threaded member is small, when the operating ring is rotated the threaded member rotates integrally due to the load resistance of the torque-increasing mechanism, the attachment thread of the threaded member being screwed onto the attachment thread of the member to be attached. When the flange surface of the flange ring comes in contact with the object to be attached, the forward screwing motion of the threaded member ceases and the rotational force on the operating ring thereafter acts on the torque-increasing mechanism and the inclined cam surface on the operating ring side of said mechanism presses against the coupled inclined cam surface of the cam ring via the needle bearing, so that said cam ring presses against the flange ring on the side in the direction of clamping through the increased torque force applied by the cam, the object to be attached being clamped by this increased torque pressure.

As a result of the above, since the torque-increasing mechanism is comprised of an inclined cam surface and a coupled inclined cam surface, the structure of the torque-increasing mechanism is simplified, manufacture is simple, and a satisfactory improvement in torque can be obtained without the requirement for precision.

Moreover, the use of a needle bearing results in linear contact with the inclined cam surface, so that smooth operation can be achieved over long periods without damage in the form of dents which interfere with smooth rotation being caused by extremely heavy loads acting to the cam surface through point pressure from, for example, ball-bearings.

Furthermore, by fitting an adjustment ring, it is possible to sense the degree of increased torque clamping. Moreover, it is possible to prevent both inclined cam surfaces overriding one another by means of two return springs or one return spring and position-restricting balls and restricting grooves, so that an accurate clamping and releasing action can be obtained.

PREFERRED EMBODIMENTS

Figure 1:
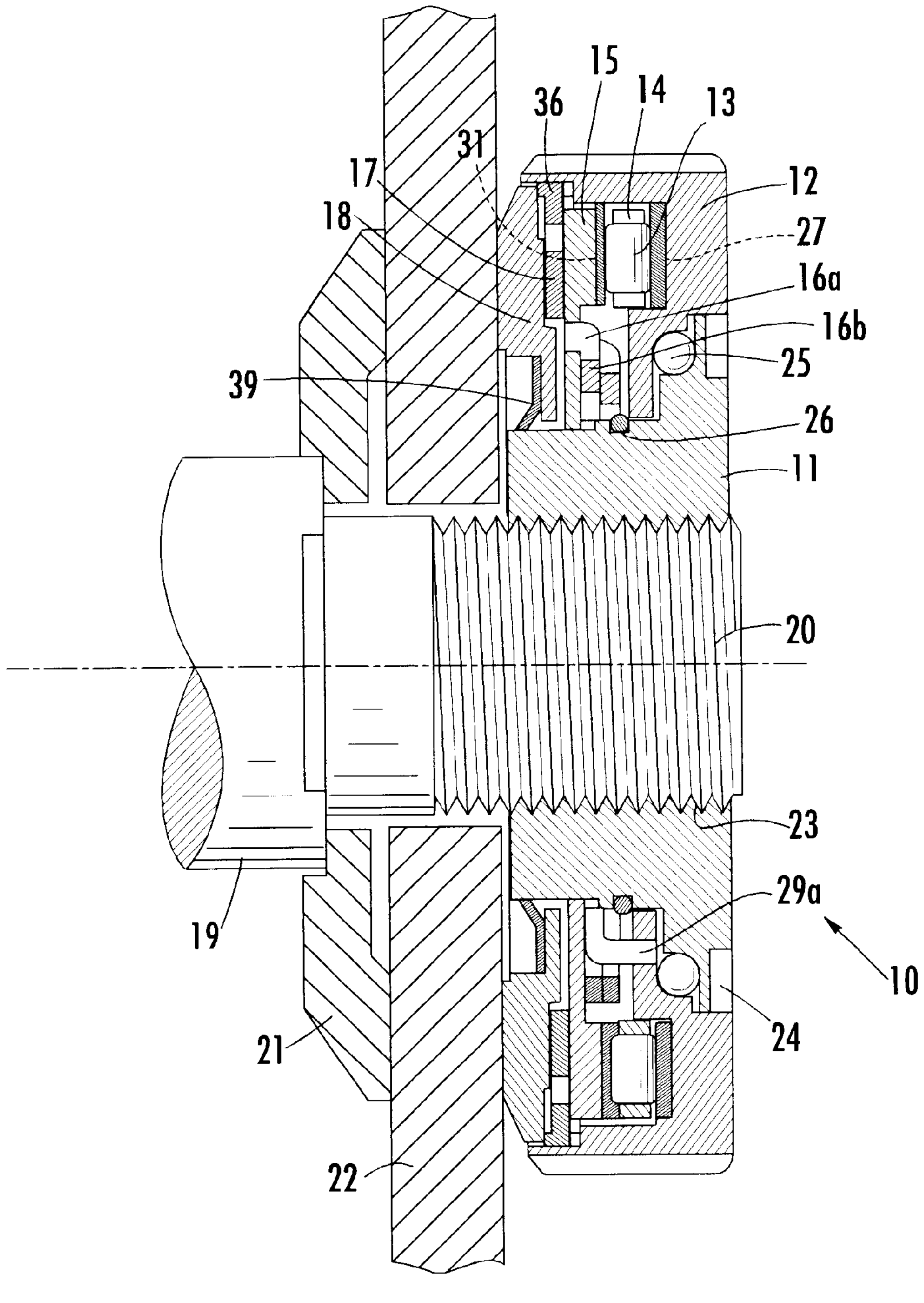
FIG. 1 is a lateral view of a cross section of the clamping screw.

An embodiment of the invention will now be described with reference to the drawings below. The drawings show a clamping screw formed in the shape of a nut, and in FIG. 1 and FIG. 2 clamping screw 10 is comprised of retainer 14 which retains nut ring 11, operating ring 12, needle bearing 13, cam ring 15, return springs 16*a*, 16*b*, adjustment ring 17, and flange ring 18, the torque-increasing mechanism being comprised of inclined cam surface 27 (to be described later and which is formed on the inside of operating ring 12), needle bearing 13, and cam ring 15.

In the drawings, 19 is, for example, the drive shaft of an electric tool, male attachment thread 20 being formed at its end, rotating tool 22 being fixed to drive shaft 19 by said clamping screw 10 through the agency of fixed flange ring 21.

Figure 3:
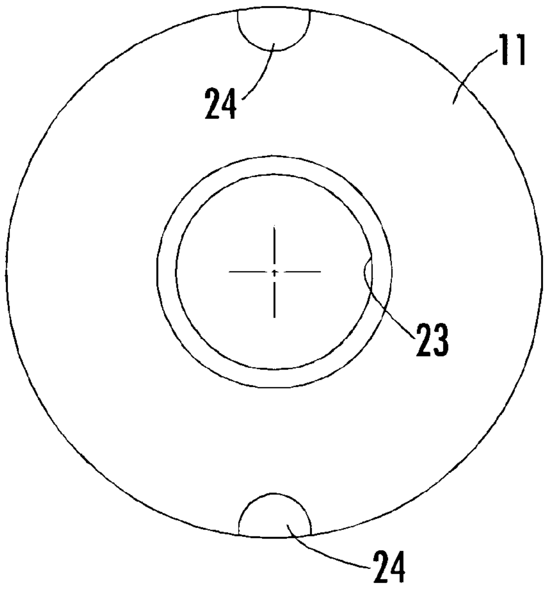
FIG. 3 is a frontal view of a nut ring.
Figure 4:
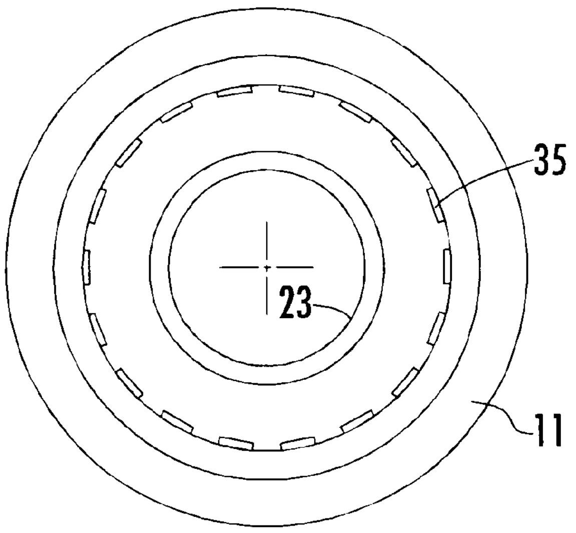
FIG. 4 is a rear view of a nut ring.

Said nut ring 11, as shown in FIG. 3 and FIG. 4, is formed in a ring shape and on its inner surface is formed a female attachment thread 23 for attachment which screws onto male thread 20 of said drive shaft 19, and on two opposing places on its outer side are formed notches 24, 24 so that nut ring 11 may be turned with a wrench.

Operating ring 12 is inserted over the outer surface of the outside of nut ring 11, being held by means of ball-bearings 25 so that rotation only is possible, and retained by retainer ring 26.

Figure 5:
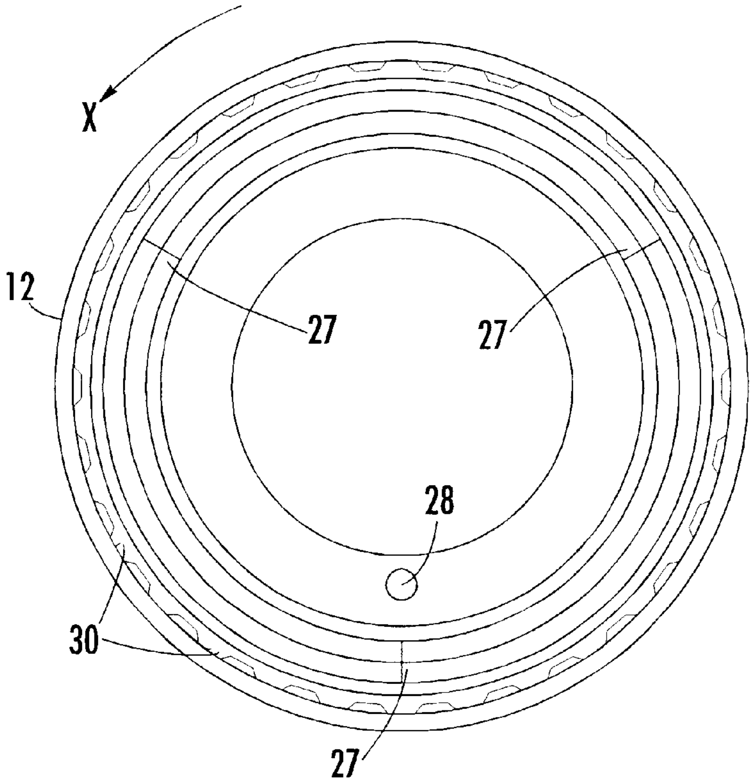
FIG. 5 is a rear view of an operating ring.

As shown in FIG. 5, operating ring 12 has formed on the circumference of its inner surface in three equidistant positions (120° intervals) inclined cam surfaces 27 which apply a force which moves needle bearings 13 in the direction of clamping which are the elements which come into contact when said operating ring 12 rotates in the direction of clamping X, the angle of inclination θ of this inclined cam surface 27 being set at an angle smaller than the angle of inclination of the thread of female thread 23 of said nut ring 11.

Notch hole 28 in one place on said operating ring 12 retains base ends 29*a*, 29*b* of the two above-mentioned return springs 16*a*, 16*b* by inserting them together. Moreover, in the inner surface are formed a number of notch depressions 30, which retain elastic members 36 of said adjustment ring 17 to be described later. Furthermore, the rotational operation is made easier by forming a suitable knurl in the outer surface (not shown in the diagram).

Figure 6:
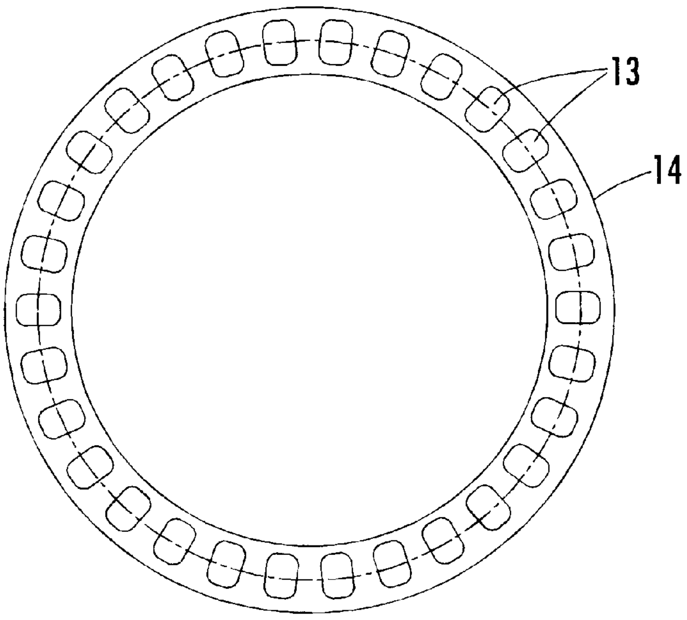
FIG. 6 is a frontal view of needle bearings.

As shown in FIG. 6, in addition to a number of needle bearings 13 being held so as to be able to rotate within retainer 14, these needle bearing 13 are also held in such a way as to be able to move in the direction of thickness of retainer 14.

Figure 7:
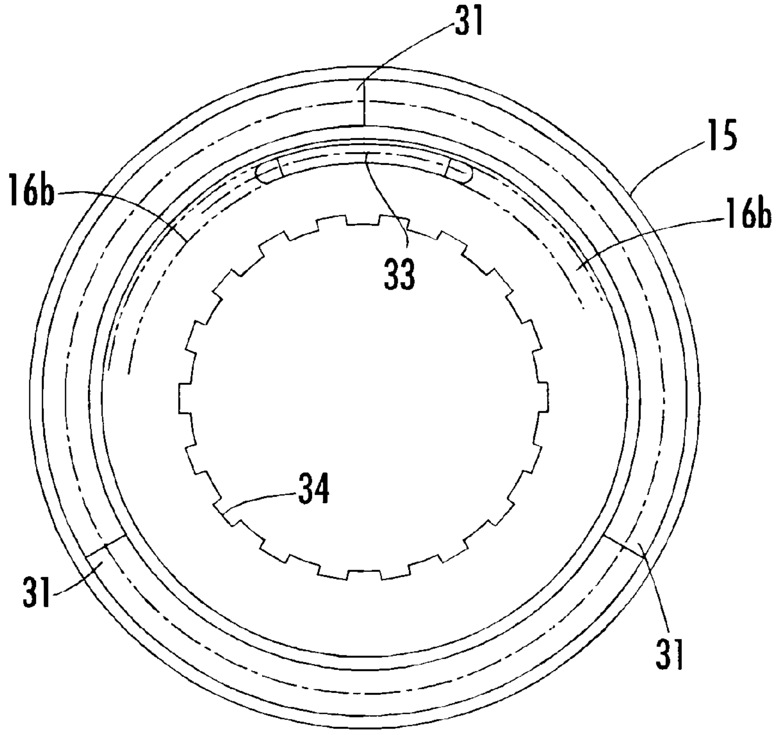
FIG. 7 is a frontal view of a cam ring.

Cam ring 15, as shown in FIG. 7, forms a ring shape, and on the surfaces corresponding with the three inclined cam surfaces 27 of said operating ring 12 are formed three coupled inclined cam surfaces 31 which correspond with the angle of inclination of said inclined cam surfaces 27, and moreover on part of the inner surface of these (for example over a range of approximately 50°) are formed arc-shaped grooves 33 which respectively retain the free ends 32*a*, 32*b* of said return springs 16*a*, 16*b*. Moreover, splines 34 are formed on the inner surface which engage with splines 35 formed on the outer surface of said nut ring 11, and are held such that they can slide in the axial direction with the small quantity of force required to clamp said cam ring 15.

As will be clear from FIGS. 5 and 7, the three inclined cam surfaces 27 of operating ring 12 and coupled inclined cam surfaces 31 of cam ring 15 are fitted so that there is a spacing of 60° between them in a neutral position, said return springs 16*a*, 16*b* acting to restrain them within the range of ±60° of said neutral position, in other words so that both inclined cam surfaces 27, 31 do not override each other.

Figure 8:
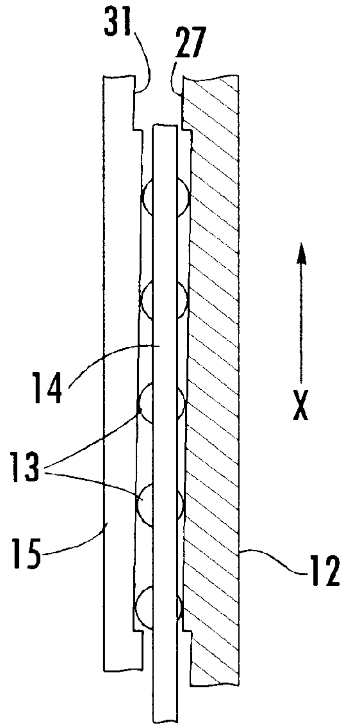
FIG. 8 is a lateral view of the developmental plane of the inclined cam surface.

Cam ring 15, needle bearings 13, and operating ring 12 come into contact as shown in FIG. 8, and since needle bearings 13 are able to move in the direction of thickness of retainer 14, it is possible to position cam ring 15 and operating ring 12 in parallel without distorting retainer 14.

This condition is achieved by (diameter of needle bearings 13)−(stepping of inclined cam surface 27)>thickness of retainer 14.

Figure 9:
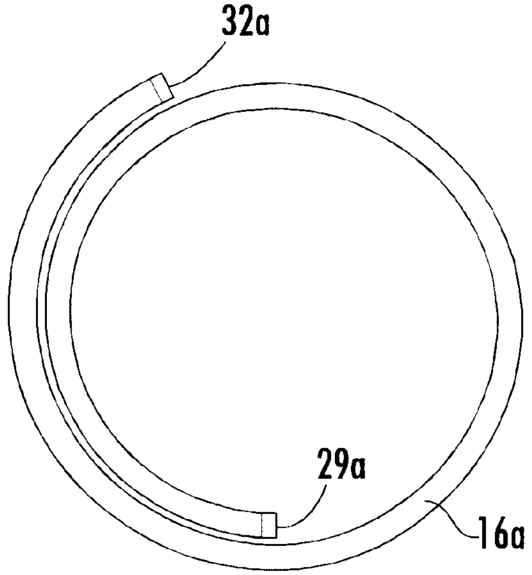
FIG. 9 is a frontal view of one of the return springs.
Figure 10:
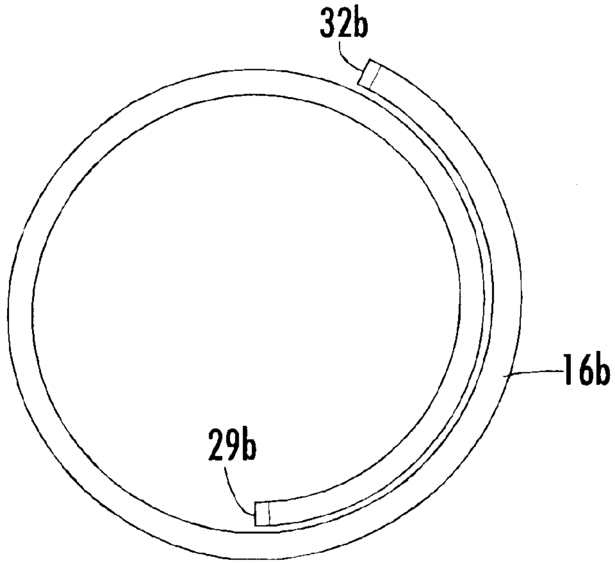
FIG. 10 is a frontal view of the other return spring.

Return springs 16*a*, 16*b*, as also shown in FIGS. 9 and 10, are formed so that their respective winding directions are opposed to one another, and formed so that an elasticity is generated in their opposing directions of wind, base ends 29*a*, 29*b* being retained together in notch hole 28 of said operating ring 12 and free ends 32*a*, 32*b* engaging with the groove ends of arc-shaped grooves 33 of cam ring 15.

When return springs 16*a*, 16*b* are retained as described above, even if operating ring 12 and cam ring 15 rotate in completely opposite directions with respect to one another, they can move back and forth in a neutral position since the force acting on them is neutralized.

Figure 11:
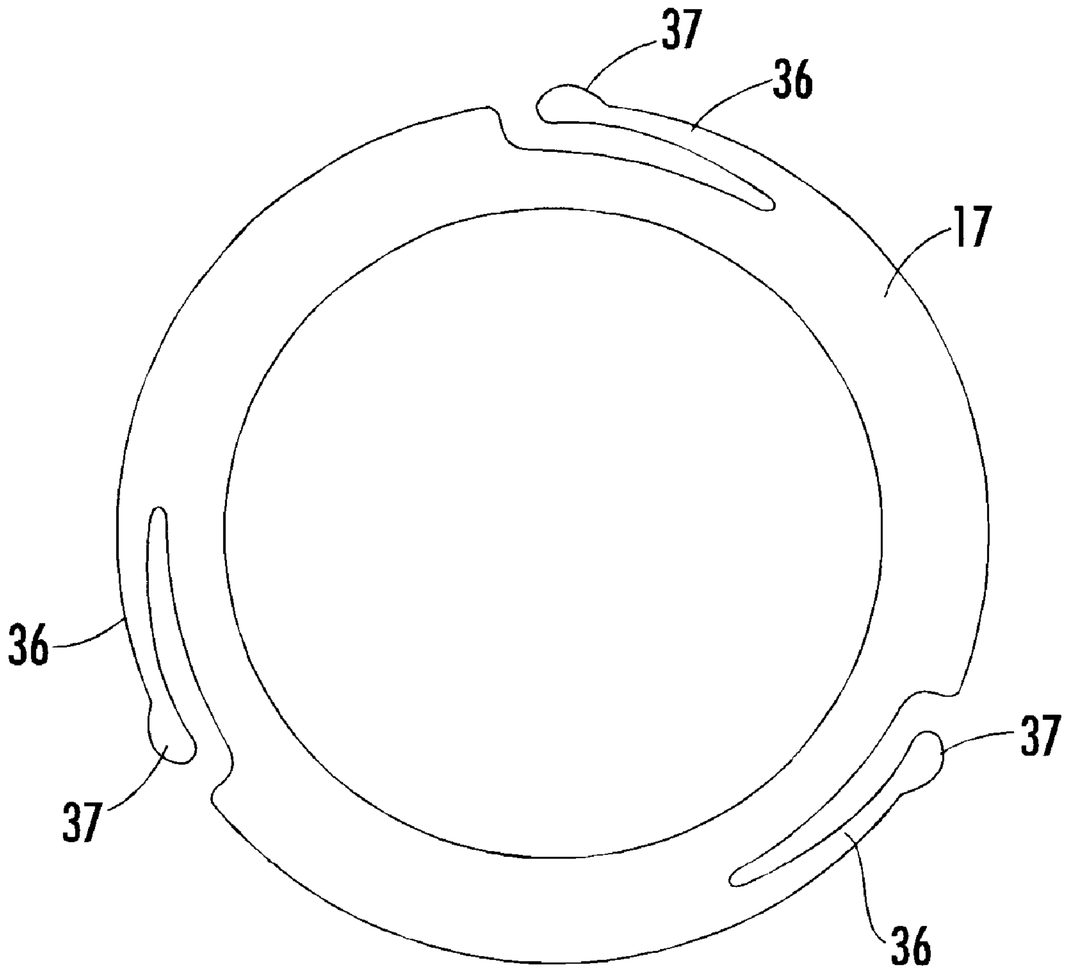
FIG. 11 is a frontal view of the adjustment ring.

Adjustment ring 17 has a ring shape, as shown in FIG. 11, and is cut out to form elastic members 36 to generate an elasticity in three equidistant positions on the outer surface, the heads 37 of elastic members 36 engaging with notch depressions 30 formed in the inner surface of said operating ring 12, elastic members 36 engaging with notch depressions 30 in the next position through elastic displacement when this adjustment ring 17 and operating ring 12 rotate relative to one another, the rotation of operating ring 12 being adjusted by this engagement. This adjustment ring 17 is held so as to be able to rotate in the step formed in the inner surface of flange ring 18.

Figure 2:
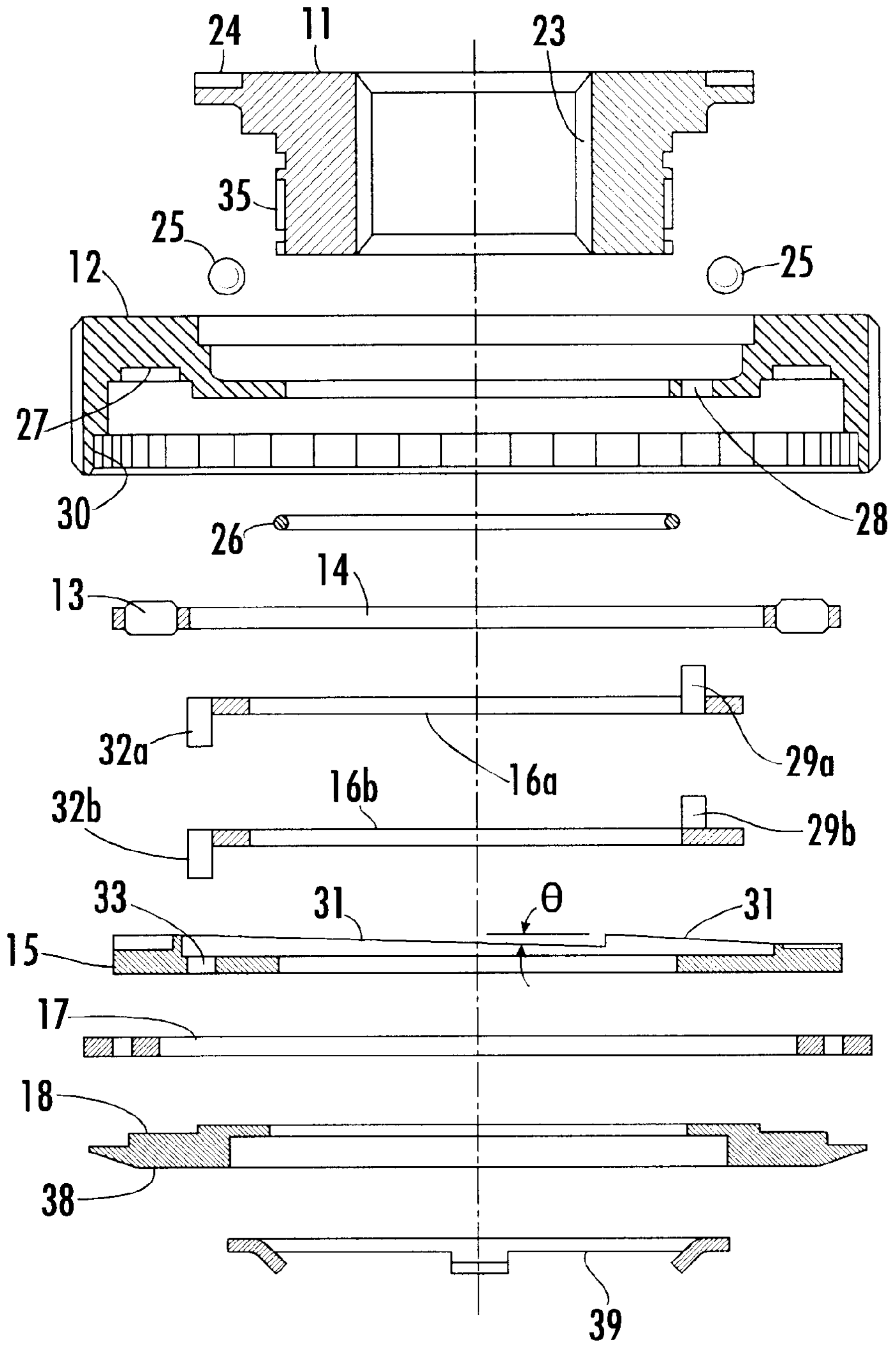
FIG. 2 an exploded view of a cross section of the clamping screw.

Flange ring 18, as shown in FIG. 1 and FIG. 2, is formed in a ring shape, and flange surface 38 on the clamping side is formed so as to be positioned on the clamping side rather than the inner surface of nut ring 11, being inserted over the inner side of said nut ring 11 and retained with a slight bracing against operating ring 12 by means of elastic ring (snap ring) 39.

To explain the action of clamping screw 10 of this structure, with reference to FIG. 1, when female thread 23 of nut ring 11 of clamping screw 10 is screwed onto male thread 20 of drive shaft 19, and since the fixed resistance load of threads 20, 23 is initially lighter than the contact resistance load within operating ring 12, when operating ring 12 is rotated nut ring 11 also rotates with it due to said contact resistance load and screws forward. With this screwing forward, flange surface 38 of flange ring 18 comes into contact with the side surface of rotating tool 22, and when the forward screwing of nut ring 11 ceases, flange ring 18, adjustment ring 17 and cam ring 15 cease rotating due to contact resistance, and in this state if operating ring 12 is rotated further in the clamping direction (approximately 30°) inclined cam surface 27 exerts pressure against coupled inclined cam surface 31 of cam ring 15 through the agency of needle bearing 13, so that this pressure presses against flange ring 18 through the agency of adjustment ring 15, and rotating tool 22 can be clamped.

If the torque of the force acting on inclined cam surface 27 of said operating ring 12 is increased by having the angle of said inclined cam surface 27 less than the angle of inclination of male thread 20 and female thread 23, by means of the effective transmission of rotational force resulting from the alleviation of rotational loss due to contact resistance acting on needle bearings 13, flange ring 18 can clamp rotating tool 22 with a force of greatly increased torque in comparison to the clamping force with which nut ring 11 can clamp rotating tool 22 directly, for example.

When clamped with a clamping force of increased torque in this way, since a relative rotation is generated between adjustment ring 17 and operating ring 12, elastic members 36 of adjustment ring 17 are displaced, and the degree of clamping can be sensed through the adjustment of adjustment ring 17.

When the above-described clamping screw 10 is removed, it is sufficient to rotate operating ring 12 in the direction of loosening. In this way contact resistance of flange ring 18 with rotating tool 22 is released so that it becomes free, and cam ring 15 is returned to its initial position by the effect of the force from the side on which the effective force of return springs 16*a*, 16*b* has been stored.

According to the above embodiment, the torque-increasing mechanism is comprised of inclined cam surface 27 and coupled inclined cam surface 31, so that the torque-increasing mechanism has a simplified structure, its manufacture is simple and a satisfactory increase in torque can be obtained without requiring precision.

Moreover, since needle bearings 13 are fitted between both cam surfaces 27 and 31, the loss of rotational force due to contact resistance is alleviated, the rotational force of operating ring 12 is effectively transmitted, and it is possible to clamp powerfully.

Furthermore, through the use of needle bearings 13, there is linear contact with inclined cam surface 27, so that smooth operation can achieved over long periods without damage in the form of dents which interfere with smooth rotation being caused by extremely heavy loads acting to the cam surface through point pressure from, for example, ball-bearings.

In the above embodiment, one or a plurality of inclined cam surfaces 27 may be formed. It is possible to obtain the effect of a satisfactory increase in torque even without needle bearing 13 or even using ball-bearings. Moreover, inclined cam surface 27 and coupled inclined cam surface 31, may be formed so that one is an inclined surface and the other a projection or convex shape. Still further, in place of nut ring 11, it is possible to have a threaded member formed with the male thread of a bolt.

Furthermore, inclined cam surface 27 is formed integrally in the inside surface of operating ring 12, but it may be formed as an independent ring member and fixed to the inside surface of operating ring 12.

The above embodiment is arranged with two return springs 16*a*, 16*b* used to act respectively in opposite directions so that both inclined cam surfaces 27, 31 do not override each other, but in a further embodiment it is possible to have a structure with a single return spring 16*c* and a rotary restraining means.

Figure 12:
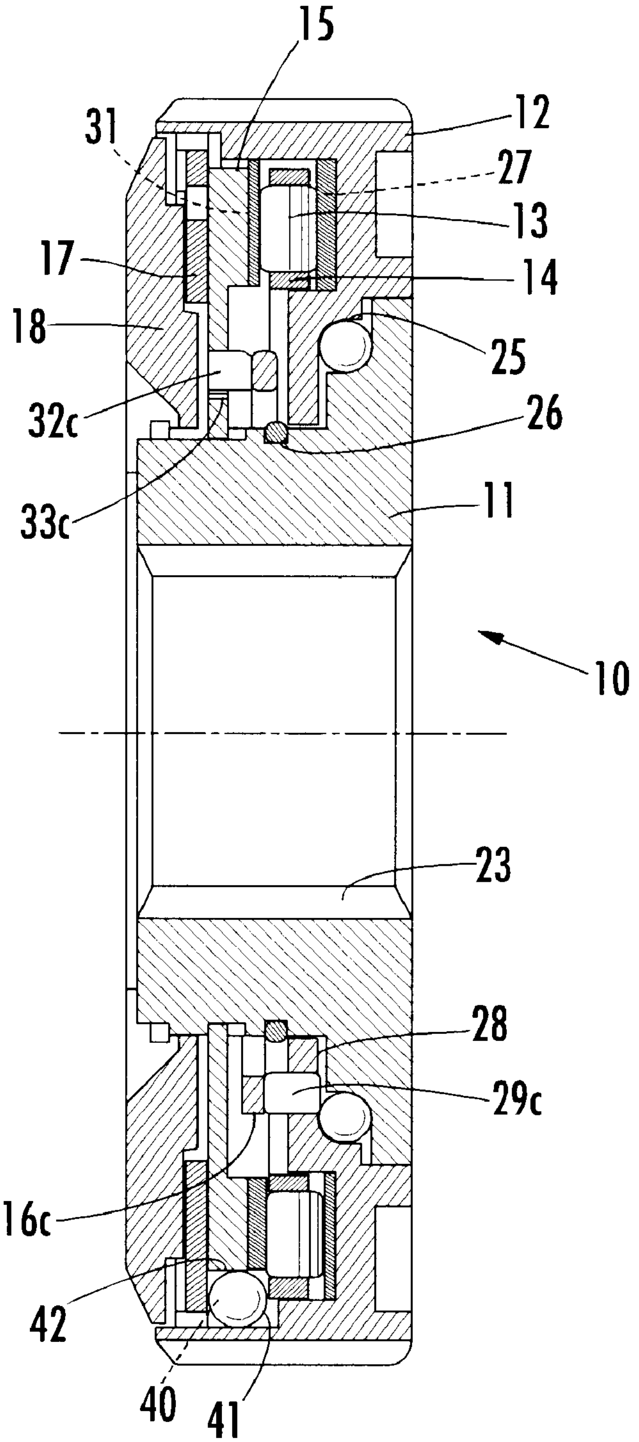
FIG. 12 is a lateral view of a cross section of another clamping screw.
Figure 13:
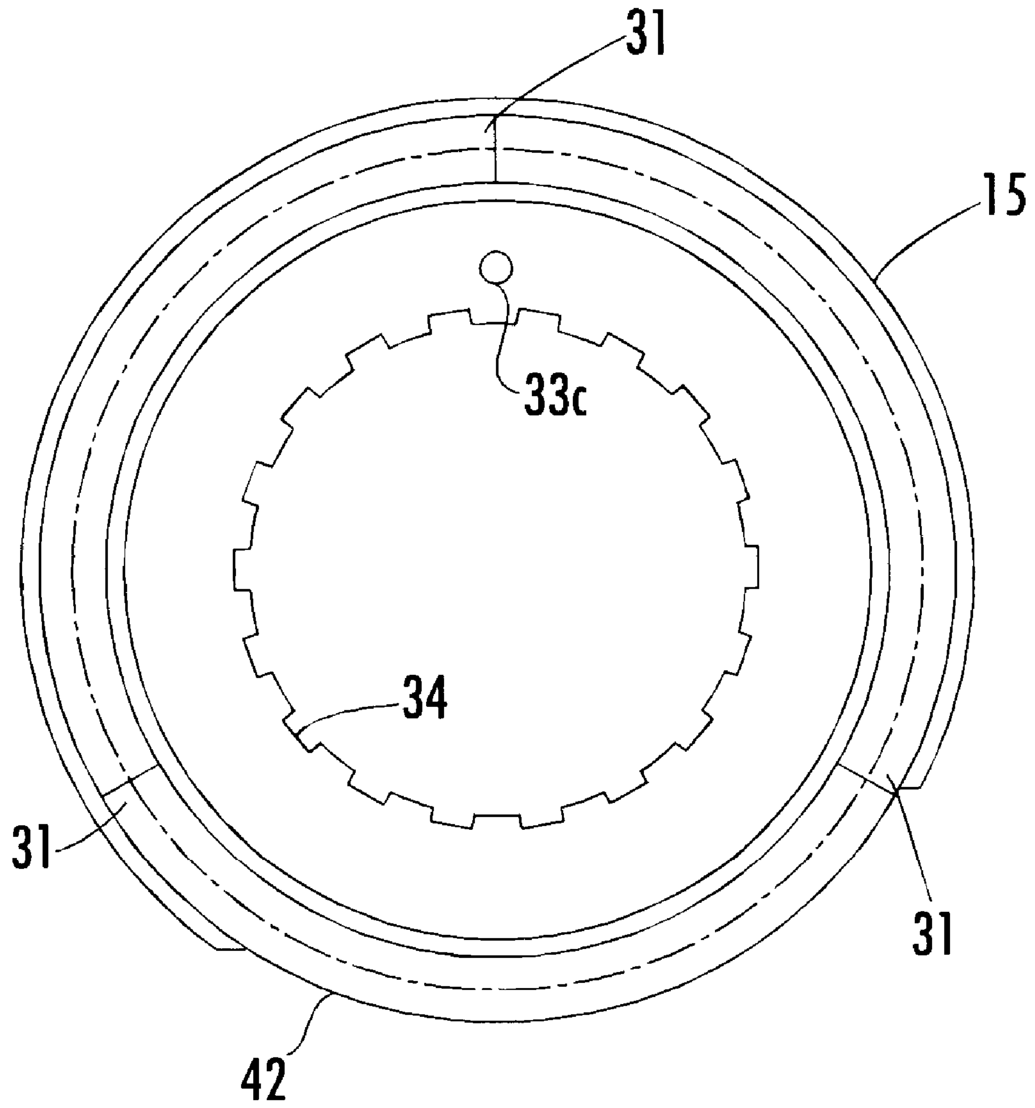
FIG. 13 is a frontal view of the cam ring used in FIG. 12.
Figure 14:
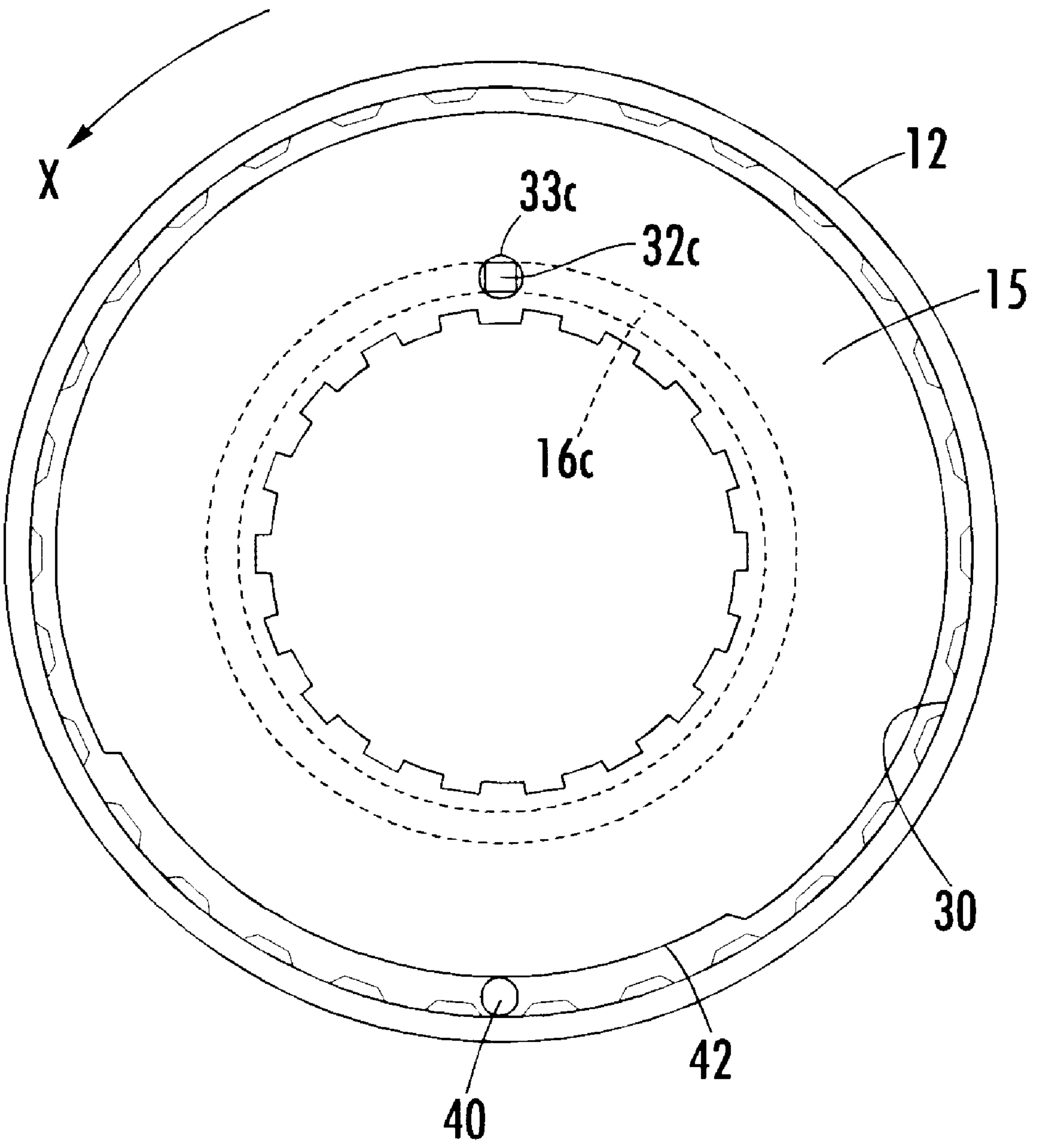
FIG. 14 is a rear view of the cam ring engaged with the operating ring in FIG. 12.

FIGS. 12, 13 and 14 show an example of a structure comprised of said single return spring 16*c* and rotary restraining means, structural parts having the same function as those in the previously described embodiment being keyed with the same numbers, a detailed description being omitted.

In addition to base 29*c* of said return spring 16*c* engaging with retaining aperture 28, its free end 32*c* engages with retaining aperture 33*c* of cam ring 15. Furthermore, depressions 41 for retaining balls 40 are formed one position within said notch depressions 30 of operating ring 12 and hold said balls 40.

With the position in which said balls 40 are held as the neutral position for return spring 16*c*, restraining groove 42 is formed in the opposing cam ring 15 over a range of approximately 90°, a little more than 30° in the direction of clamping and within 60° in the direction of release (in a range that does not override inclined cam surfaces 27, 31 in the direction of release), restraining the range of relative rotation of operating ring 12 and cam ring 15 so that it does not override both inclined cam surfaces 27, 31.

Even where structured in this way, the clamping action can be performed in the same way as for the above-described first embodiment.

Of course, since during both clamping and release the relative rotation of operating ring 12 and cam ring 15 is restrained by said balls 40 and restraining groove 42 within a range of just over 30° from the neutral position on the clamping side (since the clamping rotation is set at 30°, a range that makes this possible) and within a range of 60° on the releases side, it is prevented from overriding both inclined cams 27, 31.

In respect of the correspondence between the structure of the invention and the above embodiments, even if the threaded member of the invention corresponds to nut ring 11 of the embodiment or to a bolt-shaped threaded member formed with a male thread, and similarly below, the member to be attached corresponds to drive shaft 19, the thread for attachment corresponds to male screw 20, the object to be attached corresponds to rotating tool 22, and the torque-increasing mechanism corresponds to inclined cam 27 of operating ring 12, coupled inclined cam surface 31 of cam ring 15, and needle bearings 13, the invention is not limited merely to the structure of the above embodiments.

What is claimed is:

1. A clamping screw for holding a tool to a threaded shaft, said clamping screw comprising:

- a body member having a threaded surface for engagement with the threaded shaft;
- a flange ring disposed about said body member so that said flange ring clampingly engages the tool when the clamping screw is threaded onto the shaft in engagement with the tool;
- an operating ring rotatably disposed about said body member and retained with respect to said body member from movement axially away from said flange ring;
- a torque increasing mechanism disposed about said body member operatively between said operating ring and said flange ring and configured to transmit torque from said operating ring to said body member, said torque increasing mechanism including
  - a first inclined cam surface disposed on said operating ring,
  - a cam ring disposed about said body member so that said cam ring is axially movable, but rotationally fixed, with respect to said body member,
  - a second inclined cam surface disposed on said cam ring opposite to said first inclined surface so that said second inclined cam surface corresponds to said first inclined cam surface,
  - a bearing supported on a retainer and disposed between said first inclined cam surface and said second inclined cam surface so that said operating ring is rotatable with respect to said cam ring and so that rotation of said operating ring applies torque and axial force to said cam ring through said bearing; and
- a spring operatively disposed between said cam ring and said operating ring and biasing said cam ring toward an initial position with respect to said operating ring.

2. A clamping screw as claimed in claim 1, including an adjustment ring disposed about said body member between said cam ring and said flange ring.

3. A clamping screw as claimed in claim 1, wherein said spring includes two springs that act respectively in opposing rotational directions, each said spring being restricted in its respective position with respect to said operating ring and said cam ring so that an end of said first inclined cam surface does not override an end of said second inclined cam surface.

4. The clamping screw as claimed in claim 3, wherein said first inclined cam surface includes three inclined cam surfaces, each of said three first inclined cam surfaces defining an arc greater than 110 degrees, wherein said second coupled inclined cam surface includes three corresponding coupled cam surfaces.

5. The clamping screw as claimed in claim 4, wherein each said first inclined cam surface defines an arc of approximately 120 degrees, wherein each said second inclined cam surface defines an arc of approximately 120 degrees, and wherein said first and second cam surfaces are configured so that the maximum range of relative rotation of said operating ring with respect to said cam ring is approximately 120 degrees.

6. A clamping screw as claimed in claim 1, wherein said spring includes a single spring acting to limit rotation of said operating ring with respect to said cam ring so that an end of said first inclined cam surface does not override an end of said second inclined cam surface.

7. The clamping screw as claimed in claim 6, wherein said cam ring includes a restraining groove defined in an outer circumferential surface of said cam ring, and wherein a rolling element is disposed in said cam ring groove between said cam ring and said operating ring to limit rotation of said operating ring with respect to said cam ring.

8. The clamping screw as claimed in claim 7, wherein said rolling element is disposed within a notch in said operating ring.

9. The clamping screw as claimed in claim 1, wherein said bearing includes a plurality of needle bearings.

10. A clamping screw for holding a tool to a threaded shaft, said clamping screw comprising:

a body member having a threaded surface for engagement with the threaded shaft;

a flange ring disposed about said body member so that said flange ring clampingly engages the tool when the clamping screw is threaded onto the shaft in engagement with the tool;

an operating ring rotatably disposed about said body member and retained with respect to said body member from movement axially away from said flange ring;

a cam ring disposed about said body member so that said cam ring is axially movable, but rotationally fixed, with respect to said body member;

a first inclined cam surface disposed on said operating ring;

a second inclined cam surface disposed on said cam ring opposite to said first inclined cam surface so that said second inclined cam surface corresponds to said first inclined cam surface; and a plurality of rolling elements supported on a retainer and disposed between said first inclined cam surface and second inclined cam surface, wherein rotation of said operating ring in the direction of clamping causes said first inclined cam surface to abut said rolling elements so that said elements abut said second inclined cam surface to press said flange ring against the side of the tool being clamped.

11. The clamping screw as claimed in claim 10, wherein said plurality of rolling elements includes a plurality of needle bearings.

12. The clamping screw as claimed in claim 10, including an adjustment ring disposed between said cam ring and said flange ring, said adjustment ring including at least one radially outward biased flexible tip, said at least one tip being received in at least one of a plurality of notches defined in said operating ring so that said adjustment ring produces an audible indication when said operating ring rotates with respect to said adjustment ring.

13. A clamping screw for holding a tool to a threaded shaft, said clamping screw comprising:

a body member having a threaded surface for engagement with the threaded shaft;

a flange ring disposed about said body member so that said flange ring clampingly engages the tool when the clamping screw is threaded onto the shaft in engagement with the tool;

an operating ring rotatably disposed about said body member and retained with respect to said body member from movement axially away from said flange ring;

a cam ring disposed about said body member so that said cam ring is axially movable, but rotationally fixed, with respect to said body member;

a first inclined cam surface disposed on said operating ring;

a second inclined cam surface disposed on said cam ring opposite to said first inclined cam surface so that said second inclined cam surface corresponds to said first inclined cam surface; and a plurality of rolling elements supported on a retainer and disposed between said first inclined cam surface and second inclined cam surface, wherein rotation of said operating ring in the direction of clamping moves said first inclined cam surface in contact with said rolling elements so that said rolling elements move into contact with said second inclined cam surface to press said flange ring against the side of the tool being clamped.

14. The clamping screw as claimed in claim 13, including a biasing mechanism disposed between said cam ring and said operating configured to return said cam ring to an initial position with respect to said operating ring.

15. The clamping screw as claimed in claim 14, wherein said biasing mechanism includes a generally circumferentially extending return spring.

* * * * *